March 6, 1973 R. L. DAVIS 3,719,159
FLUID PRESSURE CONDITION WARNING DEVICE
Filed Dec. 30, 1971 2 Sheets-Sheet 1
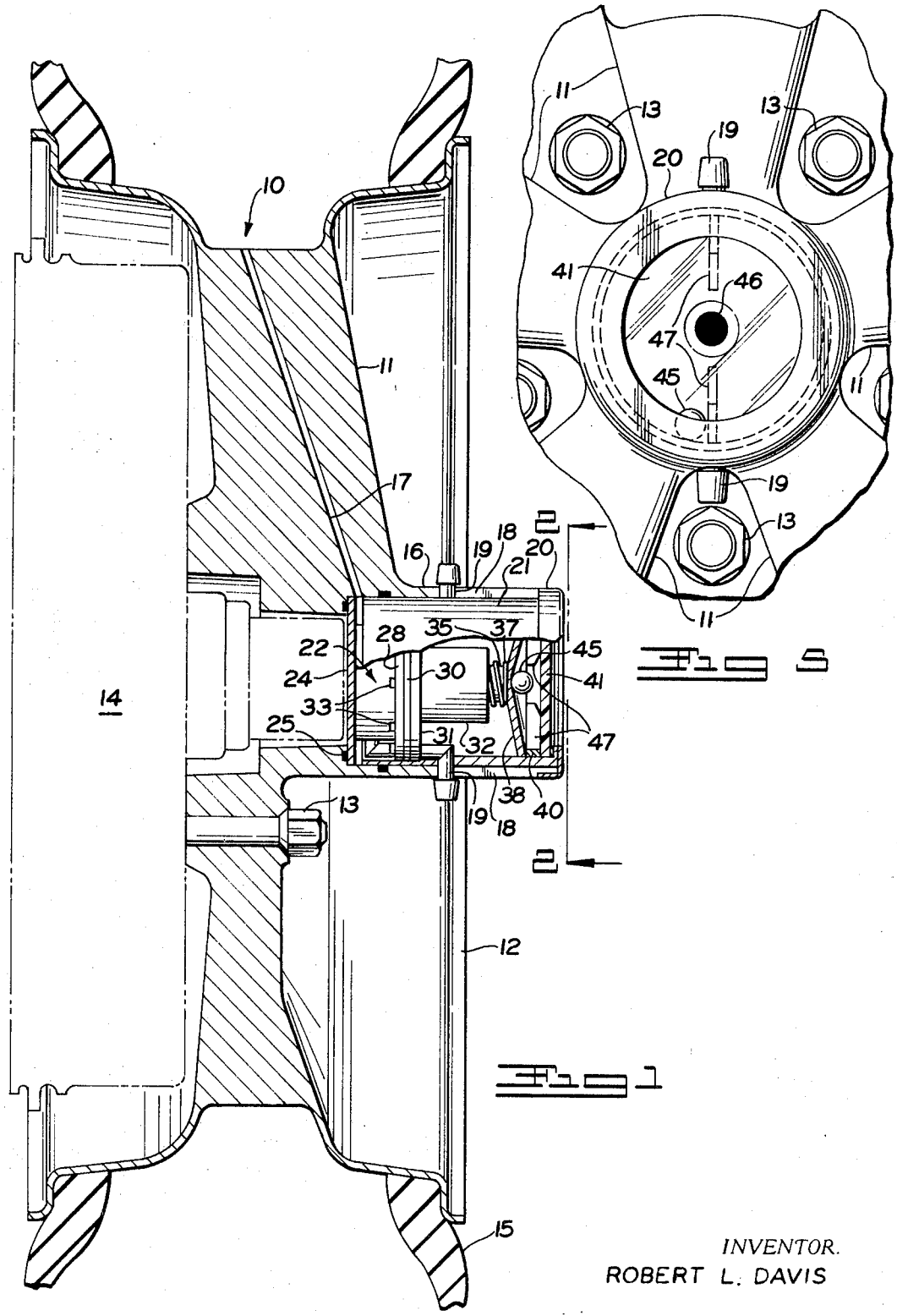
INVENTOR.
ROBERT L. DAVIS

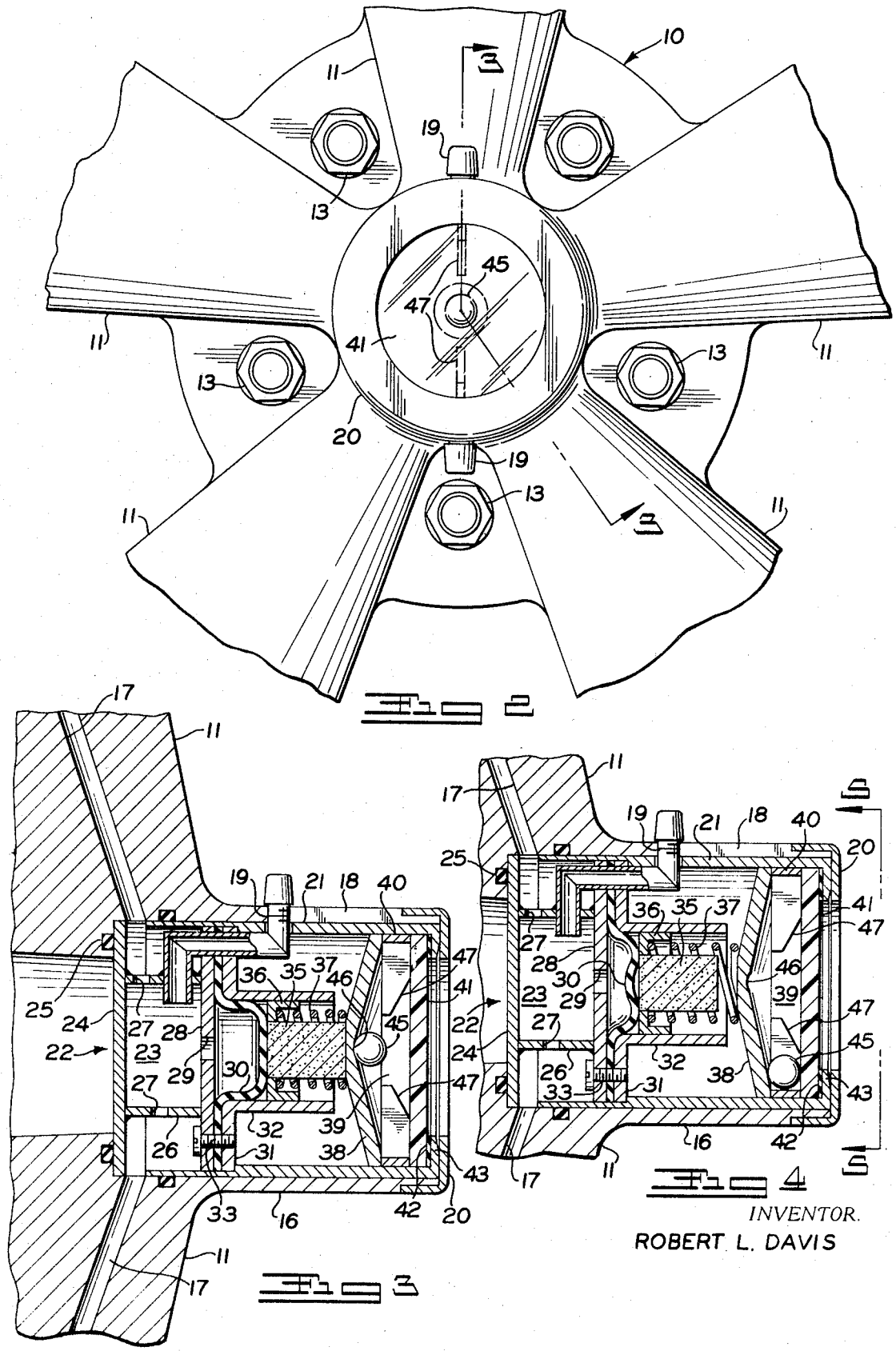

United States Patent Office 3,719,159
Patented Mar. 6, 1973

3,719,159
FLUID PRESSURE CONDITION WARNING DEVICE
Robert L. Davis, Mogadore, Ohio, assignor to The
General Tire & Rubber Company
Filed Dec. 30, 1971, Ser. No. 214,090
Int. Cl. B60c 23/02
U.S. Cl. 116—34                                    12 Claims

ABSTRACT OF THE DISCLOSURE

A device responsive to fluid pressure for detecting and indicating visually and acoustically the presence of an unacceptable pressure condition such as the underinflation of an automobile tire. The device when used on an automobile wheel is symmetrical about the axis of the wheel to assure proper wheel balance. A permanent magnet is moved in response to fluid pressure in such a way that when an unacceptable pressure condition is sensed, a steel indicator ball is released from a normal visible position to provide an indication of an unsafe tire inflation level. The ball in its released condition, causes a rattling or other audible signal to provide warning to the vehicle operator if the condition occurs while the vehicle is moving.

BACKGROUND OF THE INVENTION

This invention relates to fluid pressure level alarms responsive to a predetermined pressure condition, especially when used as safety devices that produce visual and/or acoustical warning signals. More particularly the invention relates to such pressure responsive devices adapted to continuously sense and monitor the pressure in the pneumatic tires of automotive vehicles and to alert the driver to a dangerous low pressure condition while the vehicle is travelling as well as when the vehicle is at rest.

Such devices in the prior art have been of two general types. One type utilizes an expanding chamber arrangement wherein the air pressure in a pneumatic tire is transmitted to a pressure cylinder on the wheel. A low pressure condition is sensed by the retraction movement of a piston, diaphragm or the like and the signal produced is transmitted to a warning indicator within the vehicle such as a light on the instrument panel. See e.g. U.S. Pats. Nos. 2,524,968 (Ericksen et al.), 3,472,197 (Poole), 3,508,193 (Gievannelli et al.), 3,521,230 (Poole) and 3,522,789 (Garrison).

Devices of the second type utilizes a pressure condition sensing system that may or may not have an expanding chamber arrangement and which provides a pressure condition alarm in the form of an acoustical signal such as a rattling sound. U.S. Pat. No. 3,496,903 to Adahan, discloses a device utilizing a sounding member that tumbles in a chamber in the vehicle wheel for example. Still another type uses a sensing member attached to the wheel and that extends beyond a limit position into contact with the road surface as the wheel carrying the partially deflated tire sinks lower toward the ground. See e.g. U.S. Pat. No. 2,917,020 to Rivers.

A principal disadvantage of both these types of devices is that they require a structure on the vehicle wheel that tends to prevent the proper dynamic balancing of the wheel and tire assembly. Also, in those devices that utilize an electrical circuit to transmit the low pressure warning signal to the interior of the vehicle, the system is vulnerable to damage that may cause the system to fail without the knowledge of the driver. None of the prior art devices provide a supplementary warning or alarm as an additional safeguard and more particularly none use both a visual and acoustical type of alarm signal to assure that the driver is made aware of the partially deflated condition of a tire.

The device of the present invention, however, reduces the difficulties indicated above and affords other features and advantages heretofore not obtainable.

SUMMARY OF THE INVENTION

It is a general object of the invention to provide improved safety in the operation of automotive vehicles, particularly in connection with the proper inflation of pneumatic tires.

Another object is to give warning of a fluid pressure condition that exceeds or falls below a predetermined level.

Still another object is to alert the driver of an automotive vehicle of an unacceptable low pressure condition in the vehicle tire.

A further object is to reduce the danger of automobile accidents caused by improper tire inflation.

A still further object is to provide a low pressure sensing indicating device that is contained on a vehicle wheel without affecting the dynamic balance of the wheel and tire assembly.

Still another object is to sense a low pressure condition in a pneumatic tire of an automotive vehicle and to give both a visual and acoustical warning of the unsafe condition.

These and other objects are accomplished by means of the pressure condition detecting and indicating device of the invention which is especially adapted for use in automobile wheel and tire assemblies. The device is located symmetrically about the axis of the wheel and includes a pressure chamber to which pressure is transmitted, such as through the wheel spokes, from within the tire. A piston, responsive to pressure in the chamber, carries a permanent magnet that is adapted to move into engagement with a wall formed of nonmagnetic material, during normal pressure conditions and to be retracted away from the wall when an unsafe low pressure condition occurs.

Located on the opposite side of the end wall is an indicating chamber that may be viewed from the side of the wheel, and which contains a steel indicator ball that is attracted to a normal seated condition against the end wall coaxial with the wheel when the magnet is in its normal position against the opposite side of the wall. When the magnet is retracted, the ball is released from the wall and is free to move in the chamber. Movement of the ball when the wheel is in motion causes a rattle, vibration or the like, that gives an acoustical warning signal that can be easily heard by the driver of the vehicle. Also the absence of the ball from its normal position against the wall can be observed so as to provide a visual warning of the unsafe inflation condition. When the tire is properly inflated, the magnet is forced against the wall and the indicator ball is again attracted to its normal seated position.

According to one aspect of the invention, the device includes either one or two inflation valves that are located symmetrically relative to the wheel axis and that permit the introduction of inflation air to the pressure chamber and thence to the interior of the tire.

In the preferred form the piston is moved by a flexible diaphram that forms a part of the wall of the pressure chamber.

BRIEF DESCRIPTION OF THE DRAWINGS

FIG. 1 is a cross-sectional view through a wheel and pneumatic tire assembly that contains a fluid pressure condition warning device embodying the invention, parts being broken away for the purpose of illustration;

FIG. 2 is a fragmentary side elevation of the assembly of FIG. 1 taken on the line 2—2 of FIG. 1;

3

FIG. 3 is a fragmentary cross-sectional view on an enlarged scale taken on the line 3—3 of FIG. 2;

FIG. 4 is a fragmentary sectional view similar to FIG. 3 and showing the warning device in its unsafe pressure level indicating condition; and FIG. 5 is a fragmentary side elevation taken from the line 5—5 of FIG. 4.

DESCRIPTION OF THE PREFERRED EMBODIMENT

Referring more particularly to the drawings and initially to FIG. 1, there is shown an automobile wheel broadly indicated by the numeral 10 and comprising five radial spokes 11, and a rim 12. The wheel is adapted to be secured in a conventional manner by five mounting bolts 13, to a vehicle hub and brake assembly indicated by dashed lines and broadly indicated by the numeral 14. The rim 12 is adapted to receive a pneumatic tire 15 in sealing relation in order to provide for the inflation of the tire to proper operating pressure.

In accordance with the invention the wheel 10 has a tubular cylindrical flange 16 formed about the axis of the wheel and adapted to receive the pressure condition warning device as will be described more particularly below. Radial air passages 17 are bored or otherwise formed through each of the five spokes 11 for transmitting fluid pressure within the tire to the space within the flange 16. Also the flange 16 is provided with diametrically opposite longitudinally extending slots 18 adapted to receive and permit the insertion of two diametrically opposed valve tubes 19 that are integral with the pressure condition warning device. It will be noted with two such valves provided, one may be used for the purpose of inflating the tire 15 while the other may be used with a pressure gauge to continuously monitor the pressure during inflation. Also, with two such valves located symmetrically about the axis of the tire, there is no effect on the balance of the wheel and tire assembly.

The warning device is received within the tubular flange 16 and retained therein by an annular retainer ring 20 tightly fitted over the end of the flange. The device includes a cylindrical sleeve 21 adapted to fit within the flange 16 with its inner end projecting just to the radial air passages 17 so that a space is provide to permit fluid pressure from the tire to be transmitted to the space within the sleeve 21.

Located in the inner end of the sleeve 21 is an air manifold 22 that defines an air chamber 23 and includes a solid base flange 24 that seals the warning device from the spindle hole in the wheel by means of an O-ring seal 25 located between the base flange 24 and the wheel 10. The manifold also has a central cylindrical sleeve 26 with radial air ports 27 located therein to provide communication from the air chamber 23 to the radial air passages 17. The inner ends of the valve tubes 19 also extend through the central sleeve 26 as indicated in FIGS. 4 and 5.

Located on the end of the sleeve 26 opposite the base flange 24 is another flange 28 with a central opening 29. A flexible diaphragm 30 formed for example of "neoprene" rubber and having a diameter approximately equal to the interior diameter of the sleeve 21, is clamped between the flange 28 and a cooperating radial flange 31 on a sleeve member 32. The flanges 28 and 31 are fastened together by means of machine screws 33 which extend through the outer margin of the diaphragm 30. The air pressure from the chamber 23 is transmitted through the hole 29 and forces the diaphragm 30 to the right as viewed in FIG. 3. The diaphragm 30 bears against a permanent magnet 35 which is guided for reciprocating movement within the sleeve member 32 by an annular piston 36. The magnet 35 is biased inwardly or to the left as viewed in FIGS. 1, 3 and 4, by means of a helical spring 37 that bears between the annular piston 36 and a conically shaped wall portion 38.

4

When a satisfactory tire inflation condition exists the fluid pressure acting against the diaphragm 30 is sufficient to force the permanent magnet 35 to the right as viewed in FIGS. 1 and 3 against the conical wall 38. However, when a dangerous underinflation condition exists the force of the helical spring 37 is sufficient to counteract the fluid pressure acting against the diaphragm 30 and the permanent magnet 35 is forced to the left or to a position spaced from the wall 38 as viewed in FIG. 4.

On the opposite or right hand side of the wall 38 is an indicator space 39 defined by a spacer ring 40 and a transparent circular window 41 formed of clear plastic or other durable transparent material. The window 41 is positioned against a gasket 42 located between the outer rim of the window 40 and an inwardly extending flange 43 on the outer end of the sleeve 21. Located within the indicator chamber 39 is a small steel indicator ball 45 which is adapted to fit in a central seat 46 formed at the center of the conical wall 38 as viewed in FIG. 3. The indicator ball 45 is urged to its seated condition concentric with the axis of the wheel by the permanent magnet 35 when the magnet is resting against the opposite side of the wall 38 under normal inflation pressure conditions. The magnetic attraction is sufficient to keep the ball in its seated condition through the jolts, shocks and vibrations that might occur during vehicle operation and it will be noted that the ball will not be urged out of this condition by centrifugal force generated by wheel rotation since the ball 45 is concentric about the axis of rotation of the wheel 10.

When the magnet 35 is moved by the spring 37 away from the wall 38 as indicated in FIG. 3 under tire underinflation conditions the magnetic force is insufficient to keep the ball 45 in its seat 46 and it will either fall out of its seated position such as when the vehicle is at rest or will be forced out by centrifugal force to roll, rattle etc. loosely in the indicator chamber 39. It will be noted that the spacer ring 40 is provided with two diametrically opposed, radially extending baffles 47 which further encourage and augment the tumbling motion of the ball to increase the acoustical signal to the driver.

When the vehicle is at rest the underinflation condition can be visually detected by viewing the indicator chamber 39 through the window 41 whereby it can easily be seen that the ball has fallen out of the seat 46. The seat area is advantageously painted red so that the absence of the ball (normally gray in color or of other contrasting color) can be easily seen.

It will be noted that all of the structure of the warning device is concentric or symmetrical about the axis of the tire so that none of the structure should have any effect on the proper dynamic balancing of the wheel and tire assembly. Also, the device comprises a minimal number of parts and is of light-weight and of low-cost construction. It obviates any need for electrical circuitry or other complicated systems and therefore is of exceptional reliability in assuring safe vehicle operation.

While the invention has been shown and described with reference to a specific embodiment thereof this is intended for the purpose of illustration rather than limitation and other variations and modifications of the device herein shown and described will be apparent to those skilled in the art, all within the intended spirit and scope of the invention. Accordingly, the patent is not to be limited to the specific embodiment herein shown and described nor in any other way that is inconsistent with the extent to which the progress in the art has been advanced by the invention.

What is claimed is:

1. A pressure condition warning device adapted to revolve about an axis, comprising:

means defining an indicating chamber symmetrical about said axis, said chamber having a wall transverse to said axis and visible from beyond the opposite side of said chamber, a magnet symmetrical about said axis and adapted for axial movement between an extended position in engagement with the face of said wall on the outside of said chamber, and a retracted position axially spaced from said wall, means responsive to fluid pressure to be sensed, urging said magnet to said extended position under normal pressure conditions and urging said magnet to said retracted position during an abnormal pressure condition, and an indicator ball formed of magnetic material and confined in said indicating chamber, said ball being urged and retained by magnetic force in a seated position against said wall centered at said axis, when said magnet is extended, and being in a loose condition in said chamber when said magnet is retracted.

2. A device as defined in claim 1 wherein said wall is formed of nonmagnetic material.

3. A device as defined in claim 1 wherein said pressure responsive means includes a flexible diaphragm operatively associated with said magnet and located with one side thereof in contact with the fluid under pressure to be sensed.

4. A device as defined in claim 3 wherein said pressure responsive means includes a helical spring operatively associated with said magnet and adapted to urge said magnet in a direction opposite to the force of said fluid pressure.

5. A device as defined in claim 1 in combination with an automobile wheel, said device being located at the center of said wheel coaxial therewith, said wheel having at least one radial fluid passage communicating between the rim of said wheel and said device for transmitting the inflation pressure of a pneumatic tire mounted on said wheel, to said device.

6. A device as defined in claim 5 wherein said indicating chamber is located on the outer side of said wheel when mounted on a vehicle and wherein said chamber has a transparent outer window through which the interior of said chamber is visible.

7. A device as defined in claim 5 in combination with a pneumatic tire mounted on said rim.

8. A device as defined in claim 7 wherein said magnet is extended in response to normal inflation pressure in said tire and retracted in response to an under inflation pressure condition in said tire.

9. A device as defined in claim 8 wherein said indicator ball is formed of steel and is adapted to produce an audible rattling noise when in its loose condition in said chamber and said wheel is turning.

10. A device as defined in claim 8 wherein the central portion of said wall is coated with a color indica which is covered by said indicator ball when said ball is in its seated condition.

11. A device as defined in claim 7 in combination with at least one inflation valve for said tire, said inflation valve being located on said device and adapted to transmit air through said device to inflate said tire.

12. A device as defined in claim 11 including two of said inflation valves symmetrically located about said axis.

References Cited
UNITED STATES PATENTS

| | | | |
|---|---|---|---|
| 2,788,612 | 4/1957 | Sametz | 116—67 R X |
| 2,800,795 | 7/1957 | Trinca | 73—146.3 |
| 3,521,230 | 7/1970 | Poole | 340—58 |
| 3,496,903 | 2/1970 | Adahan | 116—34 |

LOUIS J. CAPOZI, Primary Examiner

U.S. Cl. X.R.

73—146.3; 116—70; 137—227; 200—82 D; 340—58